June 28, 1949.  D. B. WESTIN  2,474,708

APPARATUS FOR FORMING GLASS ARTICLES

Filed July 8, 1946  2 Sheets-Sheet 1

INVENTOR
DANIEL B. WESTIN

BY *Parham & Bates*

ATTORNEYS

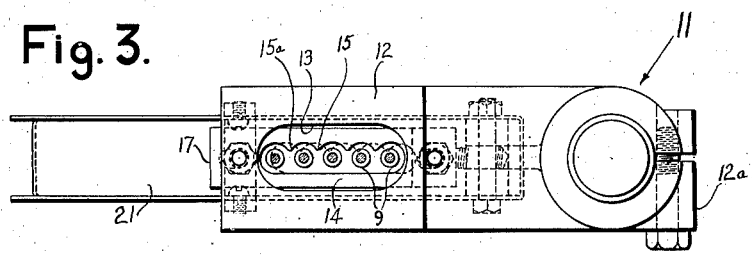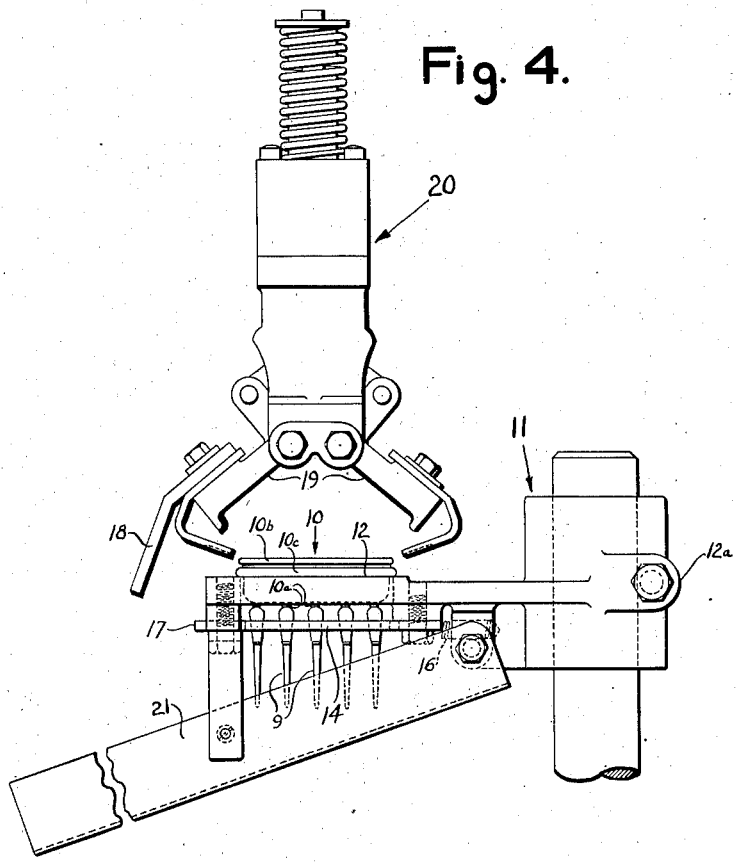

Patented June 28, 1949

2,474,708

UNITED STATES PATENT OFFICE 2,474,708

APPARATUS FOR FORMING GLASS ARTICLES

Daniel B. Westin, West Hartford, Conn., assignor to Hartford-Empire Company, Hartford, Conn., a corporation of Delaware Application July 8, 1946, Serial No. 682,071

6 Claims. (Cl. 49—14)

This invention relates generally to the manufacture of glassware and has particular relation to the production of glass articles, such as, for example, bottle stoppers which are formed plurally in gangs or groups from portions of glass of a common parent body or charge to which they remain connected during their formation and from which they subsequently are stripped or separated.

An object of the invention is to provide an efficient, automatic apparatus for producing articles of the character above described.

Apparatus constructed and operated in accordance with the invention provides novel means for handling and disposing of the glass articles and residual glass of the parent body in an efficient manner with a minimum of ware breakage.

The invention has the further advantage of being applicable to and usuable with structural and operating parts of a well-known glassware forming machine, an example of which is disclosed by Patent No. 1,911,119, granted May 23, 1933 to H. W. Ingle.

Other objects and advantages will be apparent from the following description of the invention, one embodiment of which is illustrated in the drawings in which:

Fig. 3 is an enlarged cross-sectional view taken substantially along the line 3—3 of Fig. 1; and Fig. 4 is a view similar to Fig. 2 showing the gripper mechanism in the position which it assumes prior to engaging the parent body of glass and dissociating the stoppers therefrom.

Figure 1:
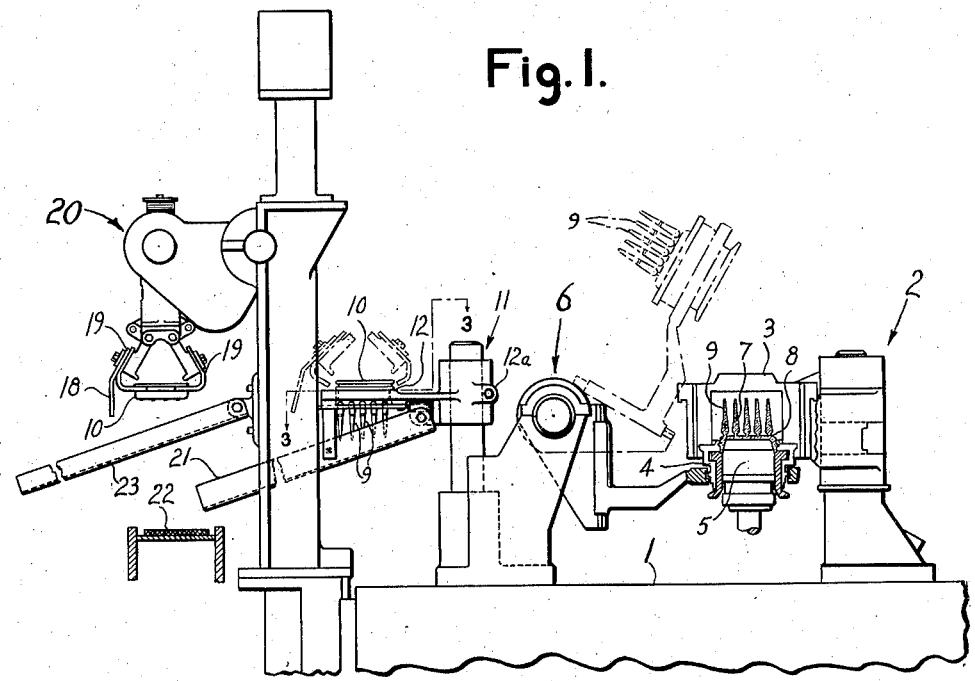
Figure 1 is an elevational view of mechanism embodying the invention.

Referring more particularly to the drawings, there is generally illustrated a bed plate or frame 1 upon which may be mounted a mold mount 2 which operably supports a two-section mold 3. Associated with the mold 3 is a two-section neck ring 4 axially aligned with a vertically reciprocable pressing plunger 5. The neck ring is carried by a transfer mechanism, generally indicated by the numeral 6, which supports, transfers and inverts the neck ring 4 and, in addition, opens and closes the sections of the neck ring.

Except as hereinafter particularly noted, the several parts of the apparatus designated generally by the numerals 2 through 6 are illustrated in the aforementioned Ingle Patent No. 1,911,119 and reference may be made thereto for the general details of the construction and operation of those parts.

It will be noted that the mold 3 herein illustrated and described differs from that shown in the Ingle patent. More particularly, mold 3 in its closed or assembled position defines a plurality of mold cavities 7 which are closed at their upper ends and communicate at their lower ends through restricted openings or gates 8 with the interior of the neck ring 4. Each of the mold cavities 7, as illustrated in Fig. 1, is adapted to receive through its runner 8 a portion of a glass charge which may be deposited in the neck ring 4 and pressed upwardly by the plunger 5 to form a glass stopper 9 in each cavity 7.

It will be seen that the mold 3 imparts a final shape to each portion of the glass charge formed in each cavity 7 thereof.

The molten glass charge may be supplied to the neck ring while the mold 3 is in its open position, the charge is received by the closed neck ring with the plunger 5 in its retracted position (not shown) whereupon the mold 3 is closed and the charge pressed into the mold cavity 7 by upward movement of the plunger 5 to the position shown in Fig. 1. As there shown, the pressing includes an inverted cup shaped parent body portion 10 and a line of vertically extending parallel glass stoppers 9 connected to the parent body or stop 10 by "break-off" runners 10a. The pressing is also formed with an annular rib 10b projecting upwardly from the lip of the cup shaped portion and with a second rib 10c parallel to and spaced from the rib 10b.

As illustrated in the drawings, the ribs 10b and 10c are both formed in the neck ring 4 and assure a positive connection between the pressing and the neck ring when the neck ring is transferred from its molding position to a second position where the runners 10a are broken to strip the stoppers 9 from the body 10.

Following the pressing operation, the mold 3 is opened and the glass pressing is transferred by the neck ring operating mechanism 6 through the position illustrated by dotted lines in Fig. 1 to a position operatively related to the supporting holder indicated generally by the numeral 11. Thereupon the mechanism 6 operates to open the neck ring 4 and release the glass pressing to the support of the holder 11 and thereafter returns the empty neck ring to its initial closed position at the forming station for receipt of another glass charge.

Referring to Fig. 4, it will be seen that following its release by the neck ring, the parent glass body 10 is supported by its rib 10b on a horizontal plate or platform 12 of the holder 11, an adjustable connection 12a being provided for varying the elevation of the supporting surface. The platform 12 includes a slot or opening 13 which generally conforms to and is adapted to receive the lower portion of the supported parent body. When supported in this manner, the fragile "break-off" runners 10a lie approximately in the plane of the lower surface of the plate 12 with the stoppers 9 vertically dependent therefrom.

A reciprocally mounted stripper bar 14 is provided for simultaneously fracturing the runners 10a and thereby simultaneously stripping the stoppers 9 from their parent body. For that purpose the stripper bar 14 is provided with a slot, one side of which is serrated to provide projections or teeth 15 extending between the depending stoppers. Camming surfaces 15a of like curvature are adapted to engage the stoppers and force them obliquely to the line of travel of the stripper bar, which line corresponds to the line connecting the several stoppers.

The stripper bar is mounted in conventional manner on the underside of the holder plate 12 and is normally urged to and resiliently restrained in its left-hand or non-engaging position relative to the stoppers by means of a compression spring 16. The left-hand or outermost end 17 of the stripper bar 14 extends outwardly beyond the holder plate 12 and is engageable by a camming member 18 which is secured to and depends from one of the two gripping members 19 of a gripper mechanism 20 operably mounted on the frame 1. The gripper mechanism 20 is illustrative of the type shown in the aforementioned Patent No. 1,911,119, to which reference may be made for the general details of construction and operation.

The operation of the gripper mechanism includes movement of the grippers 19 to a closed position relative to one another intermediate the ribs 10b and 10c, as shown by solid lines, and to open position, as shown by dotted lines in Fig. 1, and further include movement relative to the frame 1 between the two stations at which the grippers are illustrated.

Figure 2:
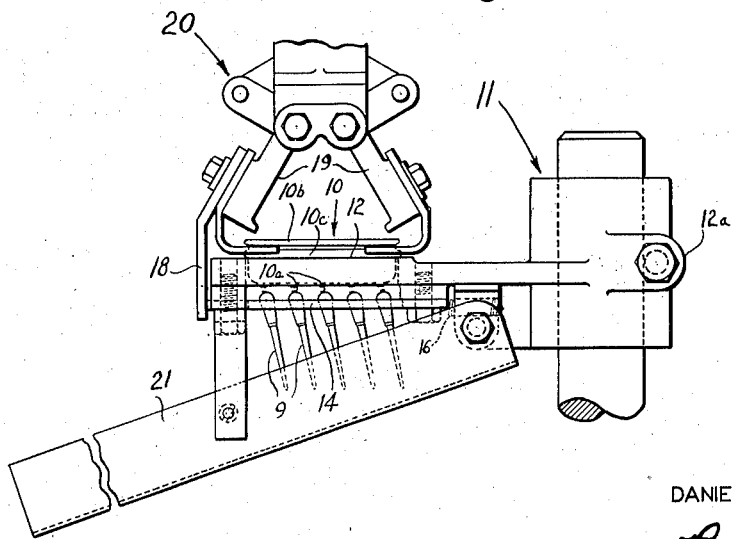
Fig. 2 is an enlarged view of a portion of Fig. 1 wherein takeout grippers are illustrated gripping a parent body common to a plurality of bottle stoppers which have been dissociated therefrom by movement of the grippers to the parent body gripping position.

The sequence of steps performed in the operation of the gripping mechanism 20 is as follows. Presuming that a glass body 10 has been placed on the holder plate 12 with the stoppers 9 depending therefrom through the plate opening 13, the gripper arms 19 in open position are moved to the position relative to the parent body 10 shown by dotted lines in Fig. 1. Thereupon the grippers or tongs 19 are closed upon the parent body 10, the grippers moving into supporting relationship with the body 10 and the circumferential protruding ribs 10b and 10c thereon. Movement of the members 19 to gripping position causes the camming member 18 to engage and force the stripper bar 14 to the right (Fig. 2). The bar 14 is moved with rapidity and as a result the depending stoppers 9 are given a sharp blow by the camming surfaces 15a. The runners 10a, being thinner and therefore weaker than the stoppers 9 and the parent body 10, are broken and the released stoppers fall without damage into a suitable receptacle, such as, for example, a chute 21 which, as shown in Fig. 1, may be located immediately beneath the stoppers. The chute 21 may be fixed relative to the frame 1 and inclined at an angle such as to minimize the possibility of breakage. In the embodiment of the invention illustrated in the drawings the chute 21 directs the stoppers to an endless conveyor 22.

Following disengagement of the stoppers from the parent body 10 and gripping of the latter by the grippers 19, the mechanism 20 transfers said body to the position shown by solid lines in Fig. 1, where the grippers 19 open and release it.

The glass body 10 may be dropped into a chute 23 and thereby be directed to a cullet storage bin (not shown). However, instead of being stored for use as cullet it would of course be possible to form the body 10, as well as the stoppers 9, for a particular end use.

Other applications and embodiments of the invention will suggest themselves to those skilled in the art together with uses therefor in combinations other than that shown. These may be made without departing from the scope of the invention, as set forth in the appended claims which are to be construed as broadly as the state of the prior art permits.

I claim:

1. Apparatus for stripping a plurality of glass articles from a single parent body of glass to which the articles are attached, comprising means for supporting said parent body with its attached articles; and operable means movable between said articles for engaging and dissociating the plurality of articles from said parent body.

2. Apparatus for stripping a plurality of aligned parallel glass articles from a single parent body of glass to which the articles are attached comprising, means for supporting said parent body with its attached articles, and reciprocal means movable between and along the line of the aligned articles for engaging and dissociating the articles simultaneously from the parent body.

3. Apparatus for stripping a plurality of aligned parallel glass articles from a single parent body of glass to which the articles are attached comprising, means for supporting said parent body with its attached articles, reciprocal means movable between and along the line of the aligned articles, said reciprocal means including a plurality of spaced camming surfaces each of which is engageable with one of said articles, said surfaces being so disposed as to engage and force said articles obliquely to the line of movement of the reciprocal means and to strip the articles from the parent body.

4. Apparatus for stripping a plurality of aligned glass articles from a common parent body, comprising a holder for said parent body having a horizontal platform for supporting said body with the plurality of glass articles depending therefrom, a stripper bar reciprocally mounted relative to said platform and the plurality of articles, means resiliently holding said stripper bar in a first position, a plurality of camming surfaces on said stripper bar each of which is constructed and arranged to engage and separate one of the plurality of articles from the parent body obliquely to the line determined by said aligned articles when said stripper bar is moved to a second position, means for gripping said parent body and removing it from said platform, and means for moving said stripper bar to said second position when said gripping means engages said parent body.

5. The combination recited in claim 4 wherein the stripping member is actuated by movement of the gripping mechanism to engage the parent body.

6. In combination with a press mold and plunger for forming at a first station a plurality of small glass articles attached to a common larger glass body, means for inverting said body and its attached articles and for transferring them to a second station, means at said second station for supporting said body with the smaller glass articles depending therefrom, an operable stripper bar having a plurality of members each of which is adapted to engage and dissociate a small article from said body, a gripping mechanism movable between the second and a third station, said mechanism including cooperating gripping members for gripping said larger article at said second station and releasing said article at the third station, and means attached to one of the cooperating gripper members for sharply actuating said stripper bar whereby the stripper members engage and sever the small articles from said body.

DANIEL B. WESTIN.

REFERENCES CITED

The following references are of record in the file of this patent:

UNITED STATES PATENTS

| Number | Name | Date |
| --- | --- | --- |
| 1,776,556 | Gray et al. | Sept. 23, 1930 |